US006594275B1

United States Patent
Schneider

(10) Patent No.: US 6,594,275 B1
(45) Date of Patent: Jul. 15, 2003

(54) FIBRE CHANNEL HOST BUS ADAPTER HAVING MULTI-FREQUENCY CLOCK BUFFER FOR REDUCED POWER CONSUMPTION

(75) Inventor: Thomas R. Schneider, Anaheim, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/160,920

(22) Filed: Sep. 25, 1998

Related U.S. Application Data

(63) Continuation-in-part of application No. 09/055,197, filed on Apr. 3, 1998.

(51) Int. Cl.[7] .................................................. H04J 3/16
(52) U.S. Cl. ........................ 370/465; 370/503; 370/537
(58) Field of Search ................................. 370/537, 539, 370/465, 466, 467, 366, 503, 506, 508, 509, 510, 513, 532; 341/100, 101

(56) References Cited

U.S. PATENT DOCUMENTS 4,157,458 A * 6/1979 Roche ...................... 179/15 A
5,648,776 A * 7/1997 Widmer ...................... 341/100
6,052,073 A * 4/2000 Carr et al. .................. 341/100
6,128,681 A * 10/2000 Shephard ..................... 710/71
6,169,501 B1 * 1/2001 Ryan ........................... 341/101

* cited by examiner

Primary Examiner—Alpus H. Hsu
Assistant Examiner—Thien Tran
(74) Attorney, Agent, or Firm—Robert D. Marshall, Jr.; W. James Brady, III; Frederick J. Telecky, Jr.

(57) ABSTRACT

A Fiber Channel host bus adapter has a low power, high speed serial to parallel data converter for converting asynchronous serial data into clock aligned, framed, parallel data utilizing a serial in, parallel out register for receiving asynchronous serial data and for providing unframed parallel data. An array of parallel in, parallel out registers is configured to receive parallel data from the serial in, parallel out data register and move the data in a parallel fashion between the parallel in, parallel out registers thereof. A pattern detection circuit identifies a location of a delimiter character within the array of a parallel in, parallel out registers. A selection circuit reads desired data bits from the array of parallel in, parallel out registers in a parallel fashion, based upon the location of the delimiter character, to define a framed parallel output word. A data alignment circuit aligns the framed parallel output word with respect to a clock to define a clock aligned, framed parallel output word.

26 Claims, 4 Drawing Sheets

FIBRE CHANNEL HOST BUS ADAPTER HAVING MULTI-FREQUENCY CLOCK BUFFER FOR REDUCED POWER CONSUMPTION

RELATED APPLICATIONS

This patent application is a continuation-in-part of U.S. Ser. No. 09/055,197, filed on Apr. 3, 1998, and entitled SERIAL/PARALLEL GHz TRANSCEIVER WITH PSEUDO-RANDOM BUILT IN SELF TEST PATTERN GENERATOR, the entire contents of which are hereby incorporated by reference.

FIELD OF THE INVENTION

The present invention relates generally to high speed data transmission and conversion systems. The present invention relates more particularly to a Fibre Channel host bus adapter having a multi-frequency clock buffer which facilitates conversion of asynchronous serial data into clock aligned, framed, parallel data in a manner which reduces power consumption by driving selected portions of a serial to parallel data converter at reduced clock speeds.

BACKGROUND OF THE INVENTION

High speed data transmission systems for communicating data between a computer and its associated peripherals, as well as between computers themselves, are well known. One example of such a high speed data communication system is Fibre Channel, which provides data transmission rates up to approximately 1 GHz when used with an optical fibre or coaxial cable transmission medium. When an optical fibre transmission medium is used, a Fibre Channel data transmission system can transmit data at such speeds even when the sender and receiver are separated by relatively great distances.

Data is transmitted over the optical fibre of a Fibre Channel system according to an asynchronous serial data transmission protocol. However, as those skilled in the art will appreciate, the internal architecture of contemporary computers is based upon parallel, byte-multiple signal buses (typically 8-bit, 16-bit or 32-bit buses). Thus, it is necessary to convert between the asynchronous serial data used for Fibre Channel communications and the parallel data used internally by the computer.

In a Fibre Channel system, byte-multiple parallel data must be converted by the transmitter into a 1 GHz asynchronous serial data signal for transmission along an optical fibre or coaxial cable and must be converted by the receiver from 1 GHz asynchronous serial data back into byte-multiple parallel data for internal use by a computer or peripheral.

In accordance with the Fibre Channel physical and signaling interface specification, defined in ANSI X3.230-1994, information to be transmitted over an optical fibre or wire cable is encoded, 8-bits at a time, into a 10-bit Transmission Character which is subsequently serially transmitted by bit. The data provided over a typical computer system parallel architecture is encoded and framed such that each data byte (8-bits from the point of view of the computer system) is formed into a Transmission Character in accordance with the Fibre Channel 8B/10B Transmission Code. The resulting 8B/10B Character is then transmitted as 10 sequential bits at approximately a 1 GHz data rate in accordance with the interface specification. Likewise, an incoming 8B/10B encoded Transmission Character must be serially received at an approximately 1 GHz data rate and converted (framed) into the corresponding 10-bit Transmission Character. The 10-bit Transmission Character is then further decoded into an 8-bit byte which is recognizable by such conventional computer architectures.

According to contemporary methodology, the conversion of high speed, e.g., 1 GHz, asynchronous serial data into byte-multiple data suitable for internal processing by a contemporary computer is performed by receiving the asynchronous serial data into a deserializer which comprises a serial in, parallel out shift register. The serial in, parallel out shift register is typically large enough to capture an entire byte-multiple word of data, so as to facilitate the detection of a delimiter character, i.e., a character such as a comma which facilitates the proper framing of the data as byte-multiple parallel data words. The serial in, parallel out shift register must also be large enough to accommodate the byte-multiple data words themselves (which are typically of the same length as the delimiter character).

A pattern detection circuit facilitates identification and location of the delimiter character within the serial in, parallel out shift register and a word alignment circuit effects alignment of the framed delimiter and subsequent data words to a desired clock signal, e.g., a 100 MHz clock.

However, one problem commonly associated with such contemporary, high speed, serial to parallel data converters is the undesirably high power consumption associated therewith. A typical contemporary serial to parallel data converter suitable for converting approximately 1 GHz asynchronous serial data into 10-bit, 100 MHz parallel data comprises approximately 50 flip flops, of which approximately 40 are clocked at 1 GHz. Of course, each of these flip flops consumes electrical power and also contributes to the heat load of any integrated circuit of which it forms a part. Further, the clock driver required to drive the flip flops has to provide sufficient power to accommodate the fanout associated therewith.

The power consumption of such a contemporary, high speed, serial to parallel data converter is higher than desired because many of the flip flops thereof must be clocked at 1 GHz, thereby undesirably increasing power consumption, as discussed further below. One contemporary high speed serial to parallel data converter which utilizes fully synchronous design techniques is known to have a worst case power consumption of approximately 500 mW.

As those skilled in the art will appreciate, the heat dissipation of a circuit is directly proportional to the power consumed thereby. When a circuit is embodied in an integrated circuit chip, then it is particularly important to mitigate the heat dissipation thereof, so as to minimize the circuit's contribution to the total heat load of the integrated circuit chip. The total heat loading of an integrated circuit must be maintained below a predetermined level so that the heat can be extracted from the integrated circuit chip (such as by using a heat sink, fan, or thermoelectric cooler, if necessary). If the heat generated by an integrated circuit chip cannot be removed therefrom fast enough, then the temperature of the integrated circuit chip increases and the integrated circuit chip is subject to malfunction and/or premature failure. Since every individual circuit of an integrated chip contributes to the heat loading thereof, it is desirable to minimize the heat load contribution of each individual circuit, so as to reduce the heat loading of the entire integrated circuit chip.

It is well known that the power consumption of a circuit is directly proportional to the frequency at which the flip flops thereof operate, according to the formula: power= capacitance×frequency×voltage$^2$. Thus, it is clear that reducing the frequency, i.e., clock rate, of selected flip flops by half reduces the power required to operate the selected flip flops by half as well.

In view of the foregoing, it is desirable to provide a serial to parallel data converter which operates with a substantial number of the flip flops thereof being clocked at a reduced rate, so as to mitigate power consumption and heat dissipation thereof.

SUMMARY OF THE INVENTION

The present invention specifically addresses and alleviates the above-mentioned deficiencies associated with the prior art by providing a serial to parallel data converter which has reduced power requirements. Reduced power consumption is facilitated by the use of an array of parallel registers for pattern detection which are clocked at a lower rate than the serial register of contemporary serial to parallel converters and therefore consume substantially less power than the contemporary serial register.

More particularly, the present invention comprises a Fibre Channel host bus adapter having a low power, high speed, serial to parallel data converter for converting asynchronous serial data into clock aligned, framed, parallel data. The data converter of the present invention comprises a serial in, parallel out register for receiving asynchronous serial data and for providing unframed parallel data. An array of parallel in, parallel out registers is configured to receive the unframed parallel data from the serial in, parallel out register and to move the received data in a parallel fashion between the parallel in, parallel out registers of the array.

A pattern detection circuit identifies the location of a delimiter character, e.g., a comma, within the array of parallel in, parallel out registers. A selection circuit reads desired data bits from the array of parallel in, parallel out registers in a parallel fashion, based upon the location of the delimiter character, so as to define a framed parallel output word containing either the delimiter character or a subsequent data word. A data alignment circuit aligns the framed parallel output word with respect to a desired clock, so as to define a clock aligned, framed parallel output word. Some data alignment may optionally be performed by the selection circuit, as well.

According to the present invention, the number of flip flops which are clocked at 1 GHz is substantially reduced as compared to contemporary high speed serial to parallel data converters. Reducing the speed at which the flip flops are clocked proportionally reduces the power consumption and heat dissipation thereof. The data converter of the present invention further comprises a multi-frequency clock. The multi-frequency clock comprises a first clock output port for providing a first clock signal to the serial in, parallel out register. The multi-frequency clock further comprises a second clock output port for providing a second clock signal to the array of parallel in, parallel out registers and to the detection circuit. The multi-frequency clock further comprises a third clock output port for providing a third clock signal to the data alignment circuit. The rate of the first clock signal is greater than the rate of the second clock signal and the rate of the second clock signal is greater than the rate of the third clock signal.

As those skilled in the art will appreciate, a 1 GHz clock signal is necessary to facilitate operation of the serial in, parallel out register when receiving asynchronous serial data at a rate of 1 GHz. However, since the serial in, parallel out register provides parallel data output at one fifth of the rate at which asynchronous serial data is input thereto, the array of parallel in, parallel out registers can be clocked at a rate lower than 1 GHz, e.g., 500 MHz. The final output of the serial to parallel data converter of the present invention is at 100 MHz, thus facilitating operation of the data alignment circuit at 100 MHz.

According to the present invention, a progression of slower clock signals is provided from the input of the serial to parallel data converter to the output thereof. In this manner, the frequency of selected portions of the serial to parallel converter is substantially reduced, thereby providing a corresponding reduction in power consumption and heat dissipation of the selected portions of the circuit. The use of the array of parallel in, parallel out registers (as opposed to the serial register used in contemporary devices) for pattern detection and data selection facilitates such reduced clock rates.

Thus, according to the preferred embodiment of the present invention, the first clock signal comprises an approximately 1 GHz clock signal for facilitating reception of asynchronous data by the serial in, parallel out register at approximately 1 GHz; the second clock signal comprises an approximately 500 MHz clock signal for facilitating identification of the delimiter character as data moves through the array of parallel in, parallel out registers; and the third clock signal comprises an approximately 100 MHz clock signal for facilitating generation of 10-bit, clock aligned, framed parallel output words at approximately 100 MHz.

The multi-frequency clock preferably further comprises a clock recovery circuit for facilitating generation of the first, second, and third clock signals from the asynchronous serial data. The clock recovery circuit preferably comprises a phase lock loop clock recovery circuit which generates or regenerates an asynchronous timing reference signal from a serial data stream and provides a timing reference to mark in time the anticipated occurrence of serial data bits. In effect, the phase-lock loop generates a synchronous stream of successive timing references, each timing reference representing, for example, a bit period with which a data bit may be associated.

According to the preferred embodiment of the present invention, the serial in, parallel out register has a smaller bit size than the bit size of the clock aligned, framed parallel output word. Preferably, the serial in, parallel out register comprises a 5-bit register and the framed output word comprises a 10-bit output word.

The serial in, parallel out register preferably comprises a serial in, parallel out shift register and the array of parallel in, parallel out register preferably comprise an array of parallel in, parallel out shift registers. The array of parallel in, parallel out shift registers preferably comprise four 5-bit parallel in, parallel out shift registers and a single 1-bit register.

The pattern detection circuit is preferably configured to detect a 10-bit delimiter word. More particularly, the pattern detection circuit is preferably configured to detect a 7-bit delimiter character contained within a 10-bit word which also contains 3 don't care bits.

Because the location of the starting bit of the delimiter character is unknown when the delimiter character is received within the serial in, parallel out register, it is necessary to locate the delimiter character as the delimiter character progresses through the array of parallel in, parallel out registers. Since a 5-bit serial in, parallel out register is utilized according to the preferred embodiment of the present invention, the delimiter character may be located at one of five different starting positions within the array of parallel in, parallel out registers. Thus, the pattern detection circuit is configured to detect the delimiter character when the delimiter character is located at one of the five different starting positions within the array of parallel in, parallel out registers.

According to the preferred embodiment of the present invention, the selection circuit comprises a plurality of multiplexers configured to select a desired sequence of bits from within the array of parallel in, parallel out registers and to provide an output representative of the selected bits. The selection circuit preferably comprises a first multiplexer array configured to select one of two different sequences of bits within the array of parallel in, parallel out registers, so as to provide a first selection which comprises the delimiter character as well as some superfluous bits. The selection circuit also comprises a second multiplexer array configured to select a desired sequence of bits from within the first selection so as to provide a second selection. The second selection defines the framed parallel output word.

According to the preferred embodiment of the present invention, the selection circuit comprises fourteen 2:1 multiplexers configured to select one of two different sequences of 14 bits within the array of parallel in, parallel out registers to provide a 14-bit first selection and comprises ten 5:1 multiplexers configured to select one of five different sequences of 10-bits within the first selection so as to provide a 10-bit second selection which defines the framed parallel output word.

Since the desired 10-bit word is moving through the array of parallel in, parallel out registers, it will pass through both of the 14-bit sequences of registers which potentially comprises the first selection. The two 14-bit selections are 5 nanoseconds apart within the array. Thus, the 14-bit sequence selected is that sequence which enhances alignment of the desired 10-bit data word with the desired clock signal.

According to the preferred embodiment of the present invention, the data alignment circuit comprises a delay register for receiving the framed parallel output word from the selection circuit and an output multiplexer for selecting the framed parallel output word from either the selection circuit or the delay register. The output multiplexer selects the framed parallel output word which enhances alignment of the framed parallel output word with a desired clock signal. Thus, the output multiplexer selects the framed parallel output word directly from the selection circuit if no delay is needed to enhance alignment of the framed parallel output word with the desired clock signal. The output multiplexer selects the framed output word from the delay register if the delay provided thereby enhances alignment of the framed parallel output word with the desired clock signal. The output multiplexer provides a substantially clock aligned, framed, parallel output word.

According to the preferred embodiment of the present invention, the data alignment circuit comprises a 10-bit parallel in, parallel out delay register for receiving the framed, parallel output word from the selection circuit and ten 2:1 output multiplexers for selecting the framed parallel output word from either the selection circuit or the delay register. The ten 2:1 output multiplexers select the frame parallel output word in a manner which further enhances alignment of the framed parallel output word with the desired clock signal. A ten nanosecond timing difference is provided between the output of the ten 2:1 multiplexers and the delay register. Thus, the ten 2:1 output multiplexers provide a substantially clock aligned, framed parallel output word.

An output register receives the course clock aligned, framed parallel output word from the output multiplexer. The output register further aligns the substantially clock aligned, framed parallel output word to the desired clock signal so as to provide a clock aligned, framed parallel output word. According to the preferred embodiment of the present invention, the output register comprises a 10-bit output register.

Thus, the present invention provides a high speed serial to parallel data converter suitable for use in a Fibre Channel receiver. The serial to parallel converter uses less power than contemporary serial to parallel data converters and is thus more suitable than contemporary serial to parallel data converters for implementation as an integrated circuit.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The detailed description sets forth the construction and functions of the invention, as well as the sequence of steps for operating the invention in connection with the illustrated embodiment. It is to be understood, however, that the same or equivalent functions may be accomplished by different embodiments which are also intended to be encompassed within the spirit and scope of the invention.

Prior to describing a presently preferred embodiment of the serial to parallel data converter of the present invention, it may be beneficial to provide a description of a prior art serial to parallel data converter. The prior art serial to parallel data converter described below contains approximately 50 flip flops (approximately 40 of which are clocked at 1 GHz) and consumes, in the worst case, approximately 500 mW. As discussed above, the consumption of such a comparatively high amount of electrical power has serious disadvantages associated therewith. Not only are the overall power requirements of the system increased undesirably, but also the clock buffer must accommodate the fan out required by the comparatively large number of flip flops which operate at high clock speeds. Further, the heat generated by such a prior art circuit is undesirably excessive.

Figure 1:
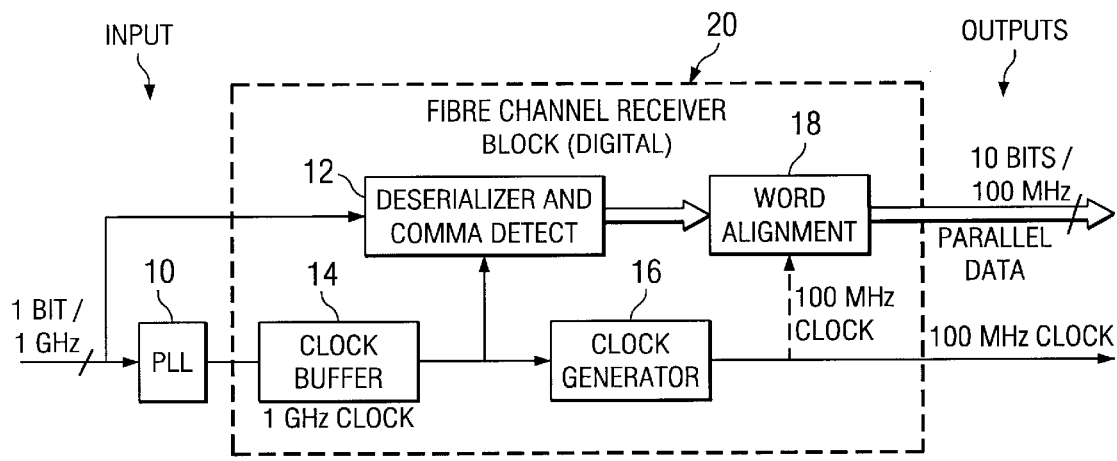
FIG. 1 is a block diagram showing a prior art Fibre Channel serial to parallel data converter.

Referring now to FIG. 1, an exemplary serial to parallel data converter is embodied as Fibre Channel receiver block 20. An asynchronous 1 GHz signal is provided to both phase lock loop 10 and deserializer and comma detect circuit 12. The deserializer and comma detect circuit 12 provides 10-bit parallel data to word alignment circuit 18 which, in turn, provides 10-bit parallel data at 100 MHz as an output for the Fibre Channel receiver block 20.

The phase lock loop 10 provides a clock output at 1 GHz to clock buffer 14, which provides a 1 GHz clock drive signal to the deserializer and comma detect circuit 12 and to the clock generator 16. The clock generator provides a 100 MHz clock signal to the word alignment circuit 18.

In operation, the phase lock loop 10 provides a 1 GHz clock output which is recovered from the 1 GHz asynchronous serial data signal provided thereto, according to well known principles. The clock buffer 14 provides clock output drive signals to the deserializer and comma detect circuit 12 and to the clock generator 16. The deserializer and comma detect circuit 12 operates at 1 GHz. According to contemporary practice, the deserializer and comma detect circuit 12 comprises a serial register (rather than an array of parallel registers as in the present invention). That is, all the circuitry necessary to convert the asynchronous serial data input signal into a parallel signal and to detect the delimiter therein is clocked at 1 GHz according to contemporary practice.

The clock generator 16 generates a 100 MHz clock signal from the 1 GHz clock provided thereto. The clock generator 16 then provides the 100 MHz clock signal to word alignment 18.

Word alignment 18 aligns the parallel data word provided by deserializer and comma detect circuit 12 to the 100 MHz clock such that a clock aligned, framed 10-bit parallel data word is provided at 100 MHz as an output of the Fibre Channel receiver block 20. The 100 MHz clock signal from the clock generator is also provided as an output from the Fibre Channel receiver block 20 for use elsewhere, e.g., by circuitry which receives the 10-bit parallel data output word of the Fibre Channel receiver block 20.

Figure 2:
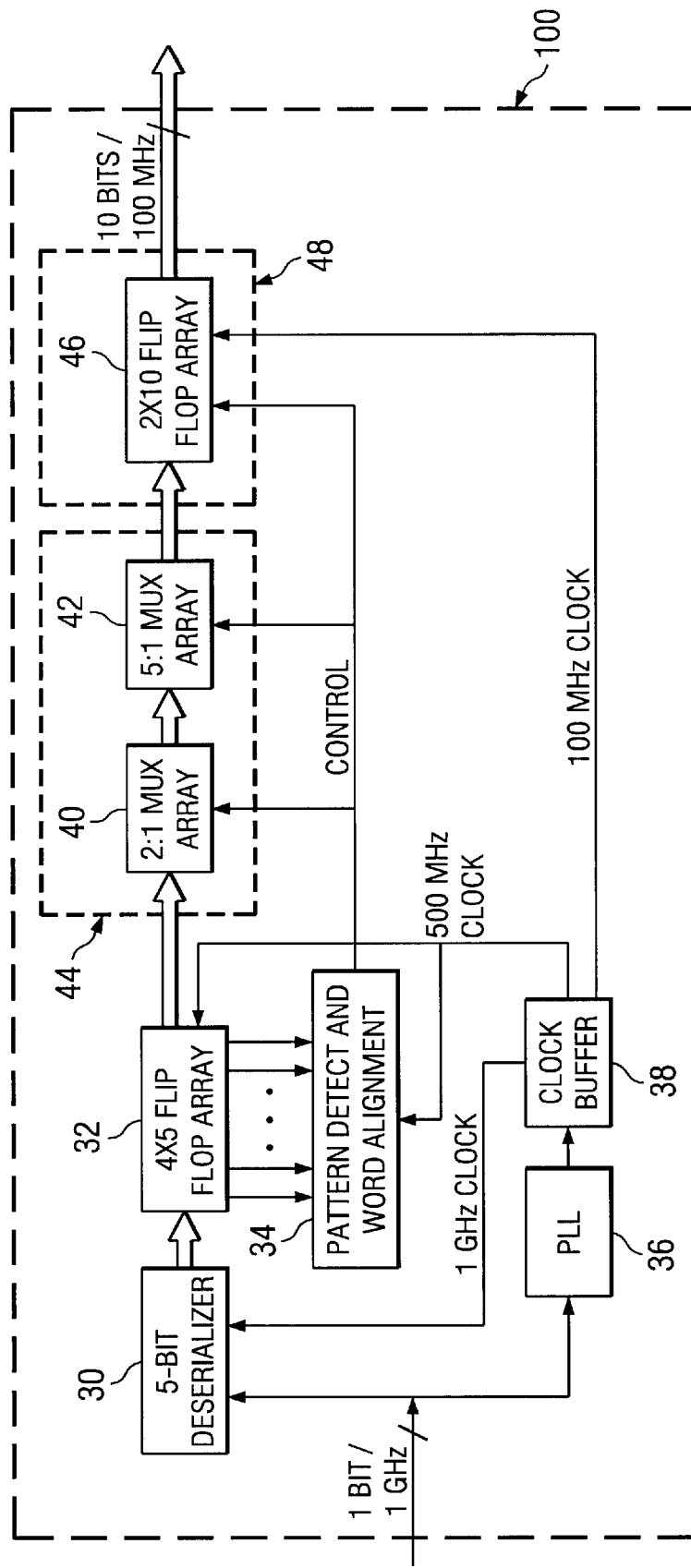
FIG. 2 is a block diagram of a serial to parallel data converter according to the present invention.

Referring now to FIG. 2, a low power, high speed serial to parallel data converter for converting asynchronous serial data into clock aligned, framed, parallel data according to the present invention is shown. Asynchronous serial data at approximately 1 GHz is provided to 5-bit deserializer 30 and to phase lock loop 36. The phase lock loop 36 provides a 1 GHz clock signal to clock buffer 38. Clock buffer 38 provides a 1 GHz clock signal to the 5-bit deserializer 30; a 500 MHz clock signal to the 4×5 flip flop array 32 and to pattern detect and word alignment circuit 34; and a 100 MHz clock signal to 2×10 flip flop array 46 (which defines word alignment circuit 48).

The 5-bit deserializer provides unframed 5-bit parallel data which is not clock aligned to the 4×5 flip flop array 32. The 4×5 flip flop array 32 provides 14-bit parallel data to the 2:1 MUX array 40. The 2:1 MUX array provides partially clock aligned 14-bit parallel data to the 5:1 MUX array 42. The 5:1 MUX array 42 provides 10-bit parallel data to the 2×10 flip flop array 46. The 2×10 flip flop array 46 provides framed, clock aligned, 10-bit parallel output at 100 MHz.

The 4×5 flip flop array 32 provides 11-bits of parallel data to pattern detect and word alignment circuit 34. Pattern detect and word alignment circuit 34 provides control signals to the 2:1 MUX array 40, the 5:1 MUX array 42 and the 2×10 flip flop array 46 to effect selections by the multiplexers thereof which select the desired data word and which enhance desired clock alignment.

Use of the 4×5 flip flop array 32 (rather than a serial register as in contemporary serial to parallel converters) facilitates clocking of the pattern detection and word alignment circuit 34 at 500 MHz, instead of 1 GHz as required in contemporary serial to parallel converters. Such reduced clock rate provides a reduction in power consumption of 50 percent for the affected circuitry.

In operation, the 5-bit deserializer 30 converts the asynchronous serial data received thereby into 5-bit parallel data which moves through the 4×5 flip flop array 32 in a manner which facilitates detection of a delimiter character, e.g., a comma, by pattern detect and word alignment circuit 34, as discussed in detail below.

The 2:1 MUX array 40 and the 5:1 MUX array 42, taken together, define a selection circuit 44 which selects one of two 14-bit sequences of consecutive bits from the 4×5 flip flop array 32 and which provide a 10-bit delimiter word or data word. Thus, the selected sequence of 14 bits contains either the 7-bit delimiter character, or a subsequent 10-bit data word. Selection of the 14 bits is performed by pattern detection and word alignment circuit 34 in a manner which enhances alignment of the framed parallel output word with the 100 MHz clock signal.

The 5:1 MUX array 42 selects one of five different 10-bit sequences from the 14-bit sequence output by the 2:1 MUX array 40. The selected 10-bit sequence contains either the delimiter word or a subsequent data word. The 2×10 flip flop array 46 effects word alignment by either selecting the direct 10-bit output of the 5:1 MUX array 42 or a 10-bit delayed output of the 5:1 MUX array 42. These operations are discussed in detail below.

It is important to note that the pattern and word alignment circuit 34 detects the location of a delimiter character within the 4×5 flip flop array 32 not only so as to facilitate proper framing of the delimiter character, but also so as to facilitate proper framing of subsequently received data words (shown in FIG. 4). Thus, once the location of the delimiter word is determined within the 4×5 flip flop array 32, then each subsequent sequence of 10-bits occupying that same location within the 4×5 flip flop array 32 defines a subsequent data word until another delimiter character is detected. This process repeats until the entire asynchronous serial data stream has been converted into framed, parallel data. As those skilled in the art will appreciate, the number of 10-bit data words which occur between delimiter characters is determined by the particular protocol utilized and is limited by physical parameters such as data transmission cable length and the accuracy with which the transmitting and receiving circuits operate.

Figure 3:
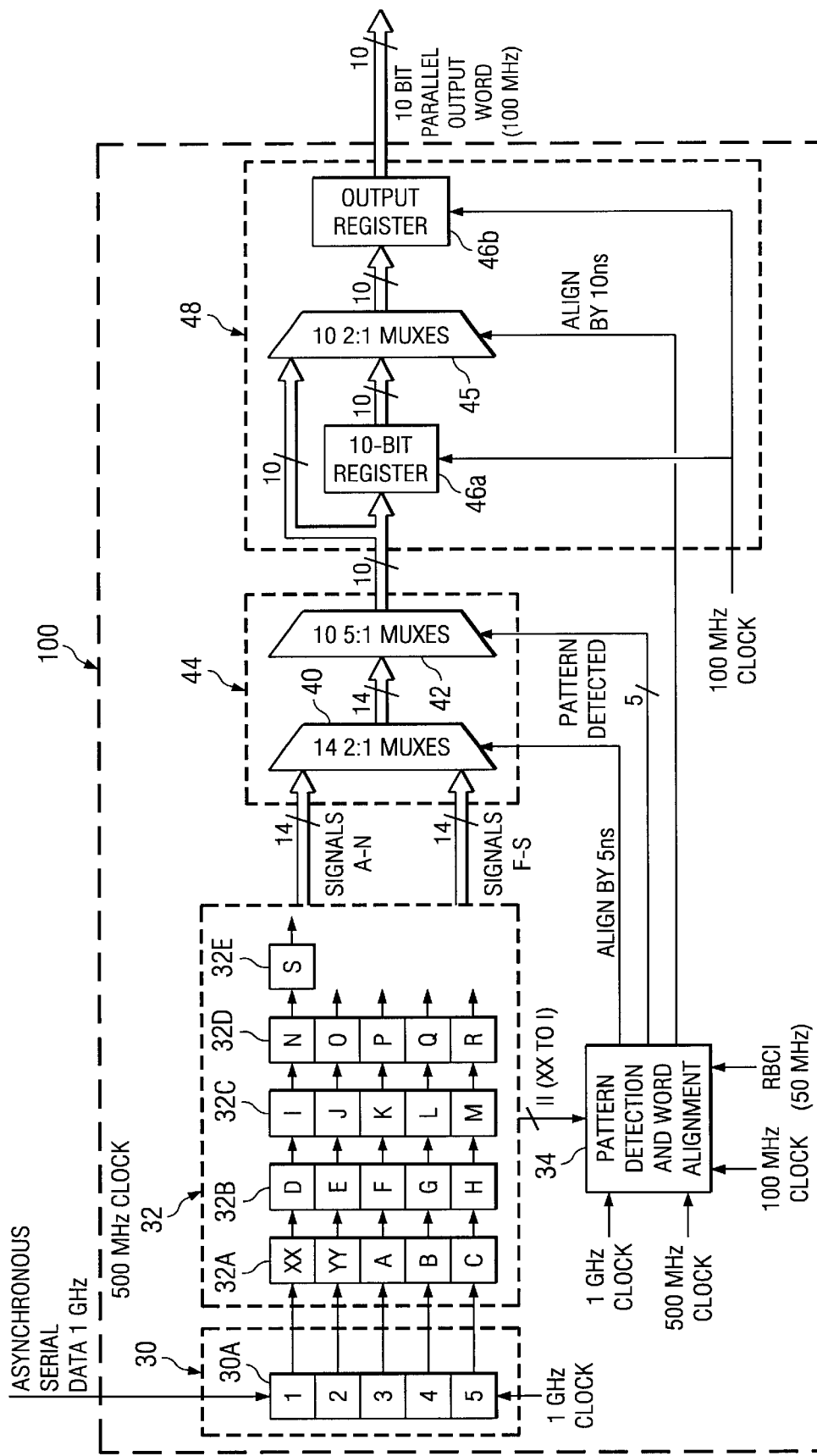
FIG. 3 is a block diagram showing the serial to parallel data converter of FIG. 2 in further detail.

Referring now to FIG. 3, operation of the low power, high speed, serial to data converter of the present invention is discussed in further detail. Asynchronous serial data at approximately 1 GHz is provided to 5-bit deserializer 30, which comprises a 5-bit serial to parallel shift register 30a and which provides a 5-bit parallel output to the 4×5 flip flop array 32.

The 4×5 flip flop array 32 comprises four 5-bit parallel in, parallel out, shift registers 32a–32d which are configured so as to move data from the 5-bit serial in, parallel out register 30a of the 5-bit deserializer 30 through the four parallel in, parallel out shift registers 32a–32d in a parallel fashion. The 4×5 flip flop array 32 further comprises a single register 32e which receives 1-bit of data from the last 5-bit parallel in, parallel out shift register 32d. The bit received by the 1-bit register 32e corresponds to the last of 5 bits received by the 5-bit serial in, parallel out shift register 30a of the deserializer 30 during each parallel output operation. The 1-bit register facilitates selection of the desired 14 bits (F–S) from the 4×5 flip flop array 32 which contain the delimiter word or data word in the event that the first register of the serial in, parallel out shift register 30a received the starting bit of the delimiter word or data word.

It is worth to mentioning that the registers of the present invention can be embodied within VLSI circuitry, and therefore need not comprise conventional shift registers, but rather need only comprise registers which are configured specifically for their intended purposes, e.g. serial to parallel conversion and parallel movement of data therethrough.

The 2:1 MUX array 40 of the selection circuit 44 comprises fourteen 2:1 MUXes which are configured to select one of two 14-bit sequences of consecutive bits from the 4×5 flip flop array 32. The particular 14-bit sequence selected will contain either the delimiter character, or a subsequent 10-bit data word, as determined by the pattern detection circuit 34. Selection of the 14-bit sequence is made so as to enhance alignment of the parallel data word by 5 nanoseconds with respect to the 100 MHz clock provided by clock buffer 38. Either bits A–N or bits F–S of the 4×5 flip flop array 32 are selected by the fourteen 2:1 MUXes 40. By selecting bits A–N, an advancement in clock alignment is provided. By waiting until the delimiter character (or subsequent data word) has moved into the next set of parallel in, parallel out registers and selecting bits F–S, a retardation in clock alignment is provided.

The 4×5 flip flop array 32 is configured so that any 10-bit data word can always be read from two different positions (either bits A–N or bits F–S) so as to provide for the desired 5 nanosecond timing correction.

Pattern detection and word alignment circuit 34 senses the state of eleven of the bit registers of the 4×5 flip flop array 32. Thus, bit registers XX to I are monitored by the pattern detect and word alignment 34 so as to detect the presence therein of a delimiter character. Pattern detection and word alignment circuit 34 receives the 1 GHz clock, 500 GHz clock, 100 MHz clock and RBC1 (50 MHz) signals from the clock buffer 38.

The align by 5 nanosecond control signal from the pattern recognition and word alignment circuit 34 causes the fourteen 2:1 MUXes to select the one of two groups of fourteen consecutive bits from the 4×5 flip flop array 72 which enhances alignment of the selected bits with the 100 MHz clock. The pattern detected control signal from the pattern detection and word alignment circuit 34 comprises 5 parallel bits which cause the ten 5:1 MUXes 42 to select the delimiter word or data word from the 14-bit output of the fourteen 2:1 MUXes. The align by 10 nanoseconds control signal from the pattern recognition and word alignment circuit 34 causes the ten 2:1 MUXes to select either the output of the ten 5:1 MUXes 42 or the output of the 10-bit delay register 46a, whichever best enhances alignment of the selected bits with the 100 MHz clock signal.

As those skilled in the art will appreciate, the 7 delimiter character bits (the 10-bit delimiter word comprises 7 delimiter character bits and 3 don't care bits) may appear at any one of five positions within the sequence of bits from XX to I, because the first bit of the delimiter character may be in any one of the five possible bit registers of the 5-bit serial to parallel shift register 30a of the deserializer 30, as discussed in detail below. The pattern detection and alignment circuit 34 senses which of the five possible positions the delimiter character is stored in (when a delimiter character and not a data word is contained within bit registers XX and I) and provides a control signal to the fourteen 2:1 MUXes 40, the ten 5:1 MUXes 42, and the ten 2:1 MUXes 45 so as to effect selection of the delimiter character, as well as any subsequent data words, and also so as to effect desired alignment thereof with the 100 MHz clock.

The ten 5:1 MUXes 42 of the selection circuit 44 select 10 sequential bits from the 14-bit output of the fourteen 2:1 MUXes 40. The 10-bit selected by the ten 5:1 MUXes 42 contain the delimiter character or a subsequent 10-bit word, and as determined by the pattern detection and word alignment circuit 34.

The ten bits selected by the ten 5:1 MUXes 42 are provided both to a 10-bit delay register 46a and to ten 2:1 MUXes 45. The ten 2:1 MUXes 45 select either the direct output from the ten 5:1 MUXes 42 or the output of the 10-bit delay register 46a, so as to effect a 10 nanosecond alignment correction, as directed by a control signal from the pattern detection and word alignment circuit 34. The 10 nanosecond delay is provided by selecting the 10-bits from the 10-bit delay register 46a, rather than from the ten 5:1 MUXes 42. Thus, the output of the ten 2:1 MUXes 45 is substantially aligned to the 100 MHz clock signal.

The output of the ten 2:1 MUXes 45 is provided to output register 46b. The output register 46b is clocked by the 100 MHz clock signal so as to provide a clock aligned, framed parallel output word.

Figure 4:
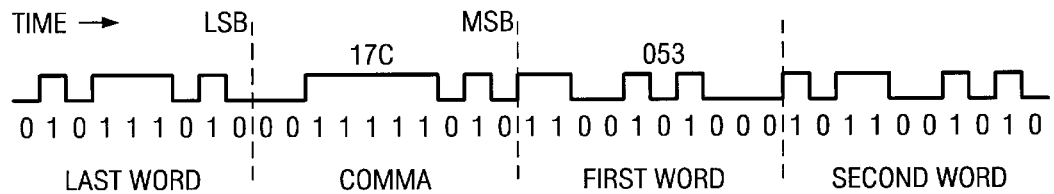
FIG. 4 shows an exemplary asynchronous serial data stream which includes a delimiter character, i.e., a comma, and two 10-bit data words.

Referring now to FIG. 4, an exemplary data stream containing a delimiter character, e.g., a comma, a first word, and a second word is shown. The last word is the last of a sequence of words which were transmitted subsequent to the prior delimiter character.

Thus, according to the present invention, the delimiter character comprises a 7-bit comma (17C hex) and 3 don't care bits for a total of 10-bits. Each subsequent word of the asynchronous serial data comprises ten bits according to the 8B/10B Fibre Channel physical and signaling interface specification defined in ANSI X3.230-1994, as discussed above. Detection of the delimiter character facilitates proper framing of the subsequent data words contained within the asynchronous serial data.

Figure 5:
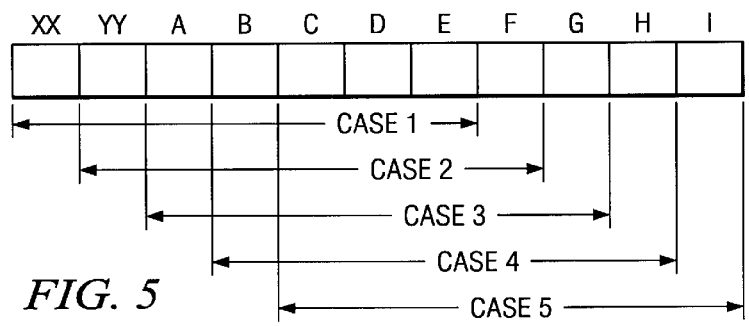
FIG. 5 shows the five possible cases for the location of a 7-bit delimiter character within the array of parallel in, parallel out registers of FIGS. 2 and 3.

Referring now to FIG. 5, the five possible locations of the seven critical bits of the 10-bit delimiter character within the 4×5 flip flop array 32 are shown. The first bit of the seven critical bits of the delimiter character may be located in register XX, YY, A, B, or C when the delimiter (as opposed to a data word) is received by the 4×5 flip flop array 32. As those skilled in the art will appreciate, this is because the delimiter character may appear at any location within the asynchronous serial data, such that the first bit of the delimiter character may be located in any one of the five individual registers of the 5-bit serial in, parallel out data register 30a when the 5-bits therein are read into the first 5-bit parallel in, parallel out register 32a of the 4×5 flip flop array 32. Since the delimiter character may be in any one of the five possible positions, all five positions must be checked by the pattern detection and word alignment circuit 34. After the position of the delimiter character within the five possible positions thereof has been determined, then the pattern detection and word alignment circuit 34 provides control signals to the selection circuit 44 and the alignment circuit 48 so as to effect selection of the desired delimiter word or any subsequent data word (which is offset by a multiple of ten bits from the delimiter word).

Figure 6:
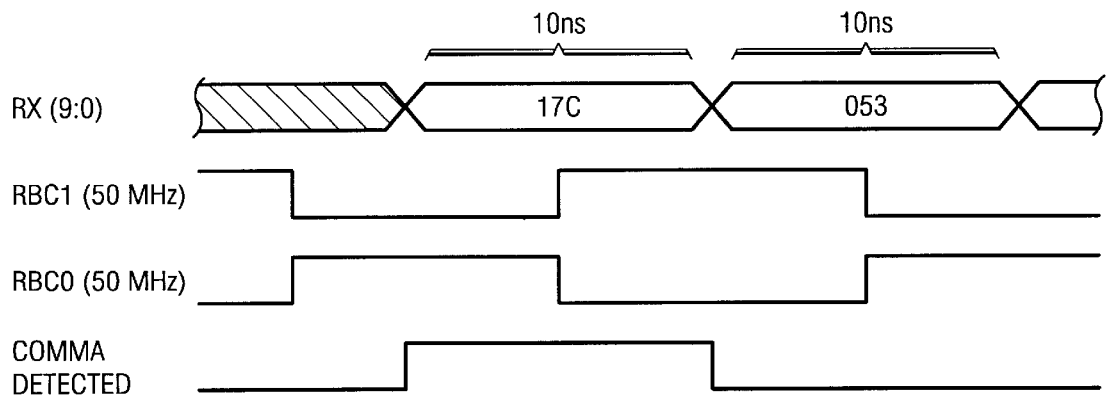
FIG. 6 is a timing diagram showing the phase relationship of the received asynchronous serial data, the 100 MHZ clock, i.e., RBC1 and RBC0, and the COMMA DETECTED signal.

Referring now to FIG. 6, a timing diagram showing the timing relationship between the received asynchronous serial data stream RX (9:0), the 100 MHz clock output of the clock buffer 38 RBC1 (50 MHz) and RBC0 (50 MHz), and the comma detect output of the pattern detection and word alignment circuit 34 are shown.

The 10-bit data words (as well as the 10-bit delimiter word) are centered upon the rising and falling edges of the 100 MHz clock signal defined by RBC1 and RBC0. More particularly, every other 10-bit data word is centered upon a rising edge of RBC1 with the alternate 10-bit data words being centered upon a rising edge of RBC0.

The comma detect is provided by pattern detection and word alignment circuit 34 as a control signal for facilitating the selection of the desired 14 bits by the fourteen 2:1 MUXes 40 and the selection of the desired 10-bits by the ten 5:1 MUXes 42.

Thus, according to the present invention a low power, high speed serial to parallel data converter for converting asynchronous serial data into clock aligned, framed, parallel data is provided. The serial to parallel data converter of the present invention consumes less power and produces less heat than contemporary serial to parallel data converters because many of the flip flops of the present invention are operated at clock speeds slower than the flip flops of contemporary serial to parallel data converters. This reduction in clock speed is facilitated by the use of the parallel in, parallel out registers 32a–32d of the 4×5 flip flop array 32, which can be operated at a lower clock speed than the single serial register of the contemporary serial to parallel converter. As mentioned above, a contemporary serial to parallel data converter containing approximately 50 flip flops is known to consume almost 500 mW in a worse case situation. By way of contrast, the serial to parallel data converter of the present invention consumes approximately 170 mW in a worse case situation. According to the present invention only about 5 flip flops are operated at 1 GHz, while about 25 flip flops are operated at 500 MHz and about 20 flip flops are operated at 100 MHz. Further, that portion of the clock buffer of the present invention which drives the 1 GHz flip flops can be much smaller than according to contemporary design, since fewer flip flops are being operated at 1 GHz according to the present invention.

Figure 7:
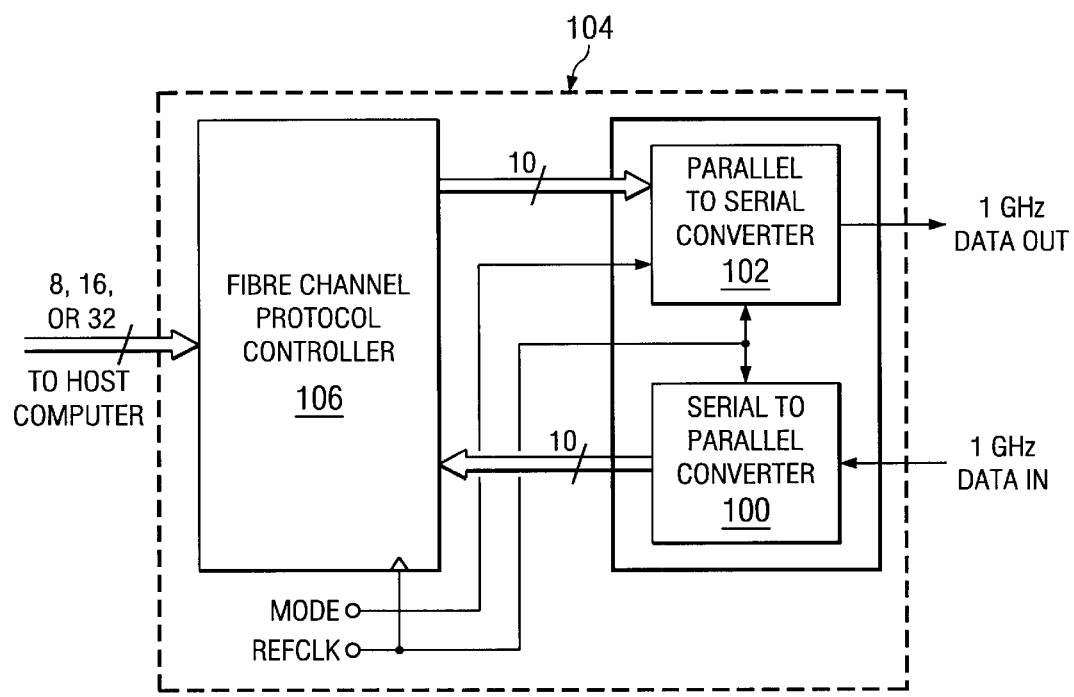
FIG. 7 is a block diagram of a Fibre Channel host bus adapter having a serial to parallel converter according to the present invention.

Referring now to FIG. 7, the serial to parallel converter 100 of the present invention is shown as a part of a host bus adapter 104, wherein it facilitates asynchronous data communication in a Fibre Channel system. The Fibre Channel Protocol Controller 106 communicates parallel data from the host computer to the parallel to serial converter 102 and receives parallel data for the host computer from the serial to parallel converter 100. The host computer communicates with the Fibre Channel Protocol converter 106 using byte-multiple data words (typically 8-bit, 16-bit or 32-bit).

It is understood that the exemplary serial to parallel data converter described herein and shown in the drawings represents only a presently preferred embodiment of the invention. Indeed, various modifications and additions may be made to such embodiments without departing from the spirit and scope of the invention. For example, various means for obtaining the desired clock signals may be utilized in place of the phase lock loop clock recovery circuit described herein. Thus, these and other modifications and additions may be obvious to those skilled in the art and may be implemented to adapt the present invention for use in a variety of different applications.

What is claimed is:

1. A low power, high speed, serial to parallel data converter for converting asynchronous serial data into clock aligned, framed, parallel data, the data converter comprising:

a serial in, parallel out register for receiving asynchronous serial data and for providing unframed parallel data, the serial in, parallel out register has a smaller bit size than a bit size of the clock aligned, framed parallel output word;

an array of a plurality of parallel in, parallel out registers coupled to receive parallel data from the serial in, parallel out register and configured to move the data in a parallel fashion between parallel in, parallel out registers thereof, each parallel in, parallel out register having the smaller bit size of the serial in, parallel out register;

a pattern detection circuit coupled to read data within the array of parallel in, parallel out registers for identifying a location of a delimiter character within the array of parallel in, parallel out registers;

a selection circuit coupled to read selected data bits from the array of parallel in, parallel out registers, selection of the data bits to be read being based upon the location of the delimiter character, the selection circuit defining a framed parallel output word; and a data alignment circuit coupled to receive the framed parallel output word from the selection circuit for aligning the framed parallel output word with respect to a clock to define a clock aligned, framed parallel output word.

2. The data converter according to claim 1, wherein the serial in, parallel out register comprises a 5-bit register and the framed parallel output word comprises a 10-bit output word.

3. The data converter according to claim 1, wherein the pattern detection circuit is configured to detect a 7-bit delimiter character.

4. The data converter according to claim 1, wherein the pattern detection circuit is configured to detect a 7-bit delimiter character contained within a 10-bit word, the 10-bit word also containing three don't care bits.

5. The data converter according to claim 1, wherein the pattern detection circuit is configured to detect a 7-bit delimiter character located at one of five different starting positions within the array of parallel in, parallel out registers.

6. The data converter according to claim 1, wherein the selection circuit comprises a plurality of multiplexers configured to select a desired sequence of bits within the array of parallel in, parallel out registers and to provide an output representative of the selected bits.

7. The data converter according to claim 1, wherein the selection circuit comprises:

a first multiplexer array coupled to select one of two different sequences of bits within the array of parallel in, parallel out registers to provide a first selection; and a second multiplexer array coupled to select a desired sequence of bits from within the first selection to provide a second selection, the second selection defining the framed parallel output word.

8. The data converter according to claim 1, wherein the selection circuit comprises:

fourteen 2:1 multiplexers coupled to select one of two different sequences of 14 bits within the array of parallel in, parallel out registers to provide a 14-bit first selection; and ten 5:1 multiplexers coupled to select one of five different sequences of 10 bits within the first selection to provide a second selection, the second selection defining the framed parallel output word.

9. The data converter according to claim 1, wherein the data alignment circuit comprises:

a delay register coupled to receive the framed parallel output word from the selection circuit; and an output multiplexer coupled to select the framed parallel output word from one of the selection circuit and the delay register, the output multiplexer selecting the framed parallel output word which enhances alignment of the framed parallel output word with a clock signal, the output multiplexer providing a substantially clock aligned, framed parallel output word.

10. The data converter according to claim 1, wherein the data alignment circuit comprises:

a 10-bit parallel in, parallel out delay register coupled to receive the framed parallel output word from the selection circuit; and ten 2:1 output multiplexers coupled to select the framed parallel output word from one of the selection circuit and the delay register, the output multiplexers selecting the framed parallel output word in a manner which enhances alignment of the framed parallel output word with a clock signal, the output multiplexers providing a substantially clock aligned, framed parallel output word.

11. The data converter according to claim 10, further comprising an output register coupled to receive the substantially clock aligned, framed parallel output word from the output multiplexers for further aligning the substantially clock aligned, framed parallel output word to the clock signal, so as to provide a clock aligned, framed parallel output word.

12. The data converter according to claim 11, wherein the output register comprises a 10-bit output register.

13. A low power, high speed serial to parallel data converter for converting asynchronous serial data transmitted at approximately 1 GHz into clock aligned, framed, 10-bit, parallel data at approximately 100 MHz while mitigating power consumption, the serial to parallel data converter comprising:

a 5-bit, serial in, parallel out register clocked at approximately 1 GHz for receiving asynchronous serial data at approximately 1 GHz and for providing 5-bit, unframed, parallel data;

four 5-bit parallel in, parallel out registers clocked at approximately 500 MHz and coupled to move the 5-bit, unframed, parallel data therethrough and one 1-bit register configured to receive one bit from a last one of the 5-bit parallel in, parallel out registers, the one bit received by the 1-bit register corresponding to a last bit of five bits received by the 5-bit, serial in, parallel out register;

a pattern detection circuit configured to identify a location of a delimiter character within the four 5-bit parallel in, parallel out registers;

fourteen 2:1 multiplexers coupled to select one of two different groups of fourteen sequential bits from the array of parallel in, parallel out registers, the two groups of fourteen different sequential bits containing the delimiter character and having starting bits which are five bits apart from one another, the selection being performed so as to provide a 5 nanosecond timing adjustment, to enhance alignment to a 100 MHz clock signal;

ten 5:1 multiplexers coupled to select one of five different groups of ten sequential bits from the fourteen 2:1 multiplexers, the selected group of ten sequential bits defining a framed 10-bit data word;

a 10-bit parallel in, parallel out delay register clocked at approximately 100 MHz coupled to receive the framed 10-bit data word from the ten 5:1 multiplexers;

ten 2:1 multiplexers coupled to select one of the framed 10-bit data word from the ten 5:1 multiplexers and the framed 10-bit data word from the 10-bit parallel in, parallel out delay register, the selection being performed so a to provide a 10 nanosecond timing adjustment to further enhance alignment to the 100 MHz clock signal; and a 10-bit output register coupled to receive the framed 10-bit data word from the ten 2:1 multiplexers, the 10-bit output register being clocked at approximately 100 MHz so as to provided clock aligned, framed 10-bit parallel data at approximately 100 MHz.

14. A Fibre Channel host bus adapter for transferring digital information between a host computer and a Fibre Channel network, the host bus adapter comprising:

a Fibre Channel protocol controller coupled to communicate with the host computer for applying Fibre Channel protocol to data received from the host computer to facilitate transmission of the data via the Fibre Channel network and for removing Fibre Channel protocol from data received from the Fibre. Channel network to facilitate communication of the received data to the host computer;

a parallel to serial converter coupled to communicate data received from the Fibre Channel protocol controller to the Fibre Channel network;, a serial to parallel data converter for converting asynchronous serial data from the Fibre Channel network into clock aligned, framed, parallel data for use by the host computer, the data converter comprising:

a serial in, parallel out register for receiving the asynchronous serial data and for providing unframed parallel data, the serial in, parallel out register having a smaller bit size than a bit size of the clock aligned, framed parallel output word;

an array of a plurality of parallel in, parallel out registers coupled to receive parallel data from the serial in, parallel out register and configured to move the data in a parallel fashion between parallel in, parallel out registers thereof, each parallel in, parallel out register having the smaller bit size of the serial in, parallel out register;

a pattern detection circuit coupled to read data within the array of parallel in, parallel out registers for identifying a location of a delimiter character within the array of parallel in, parallel out registers;

a selection circuit coupled to read selected data bits from the array of parallel in, parallel out registers, selection of the data bits to be read being based upon the location of the delimiter character, the selection circuit is defining a framed parallel output word; and a data alignment circuit coupled to receive the framed parallel output word from the selection circuit for aligning the framed parallel output word with respect to a clock to define a clock aligned, framed parallel output word.

15. The host bus adapter according to claim 14, wherein the serial in, parallel out register comprises a 5-bit register and the framed parallel output word comprises a 10-bit output word.

16. The host bus adapter according to claim 14, wherein the pattern detection circuit is configured to detect a 10-bit delimiter character.

17. The host bus adapter according to claim 14, wherein the pattern detection circuit is configured to detect a 7-bit delimiter character contained within a 10-bit word, the 10-bit word also containing three don't care bits.

18. The host bus adapter according to claim 14, wherein the pattern detection circuit is configured to detect a 7-bit delimiter character located at one of five different starting positions within the array of parallel in, parallel out registers.

19. The host bus adapter according to claim 14, wherein the selection circuit comprises a plurality of multiplexers configured to select a desired sequence of bits within the array of parallel in, parallel out registers and to provide an output representative of the selected bits.

20. The host bus adapter according to claim 14, wherein the selection circuit comprises:
a first multiplexer array coupled to select one of two different sequences of bits within the array of parallel in, parallel out registers to provide a first selection; and
a second multiplexer array coupled to select a desired sequence of bits from within the first selection to provide a second selection, the second selection defining the framed parallel output word.

21. The host bus adapter according to claim 14, wherein the selection circuit comprises:
fourteen 2:1 multiplexers coupled to select one of two different sequences of 14 bits within the array of parallel in, parallel out registers to provide a 14-bit first selection; and
ten 5:1 multiplexers coupled to select one of five different sequences of 10 bits within the first selection to provide a second selection, the second selection defining the framed parallel output word.

22. The host bus adapter according to claim 14, wherein the data alignment circuit comprises:
a delay register coupled to receive the framed parallel output word from the selection circuit; and
an output multiplexer coupled to select the framed parallel output word from one of the selection circuit and the delay register, the output multiplexer selecting the framed parallel output word which enhances alignment of the framed parallel output word with a clock signal, the output multiplexer providing a substantially clock aligned, framed parallel output word.

23. The host bus adapter according to claim 14, wherein the data alignment circuit comprises:
a 10-bit parallel in, parallel out delay register coupled to receive the framed parallel output word from the selection circuit; and
ten 2:1 output multiplexers coupled to select the framed parallel output word from one of the selection circuit and the delay register, the output multiplexers selecting the framed parallel output word in a manner which enhances alignment of the framed parallel output word with a clock signal, the output multiplexers providing a substantially clock aligned, framed parallel output word.

24. The host bus adapter according to claim 23, further comprising an output register coupled to receive the substantially clock aligned, framed parallel output word from the output multiplexers for further aligning the substantially clock aligned, framed parallel output word to the clock signal, so as to provide a clock aligned, framed parallel output word.

25. The host bus adapter according to claim 24, wherein the output register comprises a 10-bit output register.

26. A Fibre Channel host bus adapter for transferring digital information between a host computer and a Fibre Channel network, the host bus adapter comprising:
a Fibre Channel protocol controller coupled to communicate with the host computer for applying Fibre Channel protocol to data received from the host computer to facilitate transmission of the data via the Fibre Channel network and for removing Fibre Channel protocol from data received from the Fibre Channel network and for communicating the received data to the host computer;
a parallel to serial converter coupled to communicate data received from a Fibre Channel protocol controller to the Fibre Channel network;
a serial to parallel data converter for converting asynchronous serial data transmitted at approximately 1 GHz by the Fibre Channel network into clock aligned, framed, 10-bit, parallel data at approximately 100 MHz for use by the host computer while mitigating power consumption, the data converter comprising:
a 5-bit, serial in, parallel out register clocked at approximately 1 GHz for receiving asynchronous serial data at approximately 1 GHz and for providing 5-bit, unframed, parallel data;
four 5-bit parallel in, parallel out registers clocked at approximately 500 MHz and coupled to move the 5-bit, unframed, parallel data therethrough and one 1-bit register configured to receive one bit from a last one of the 5-bit parallel in, parallel out registers, the one bit received by the 1-bit register corresponding to a last bit of five bits received by the 5-bit, serial in, parallel out register;
a pattern detection circuit configured to identify a location of a delimiter character within the four 5-bit parallel in, parallel out registers;
fourteen 2:1 multiplexers coupled to select one of two different groups of fourteen sequential bits from the array of parallel in, parallel out registers, the two groups of fourteen different sequential bits containing the delimiter character and having starting bits which are five bits apart from one another, the selection being performed so as to provide a 5 nanosecond timing adjustment to enhance alignment to a 100 MHz clock signal;
ten 5:1 multiplexers coupled to select one of five different groups of ten sequential bits from the fourteen 2:1 multiplexers, the selected group of ten sequential bits defining a framed 10-bit data word;
a 10-bit parallel in, parallel out delay register clocked at approximately 100 MHz coupled to receive the framed 10-bit data word from the ten 5:1 multiplexers;
ten 2:1 multiplexers coupled to select one of the framed 10-bit data word from the ten 5:1 multiplexers and the framed 10-bit data word from the 10-bit parallel in, parallel out delay register, the selection being performed so a to provide a 10 nanosecond timing adjustment to further enhance alignment to the 100 MHz clock signal; and
a 10-bit output register coupled to receive the framed 10-bit data word from the ten 2:1 multiplexers, the 10-bit output register being clocked at approximately 100 MHz so as to provided clock aligned, framed 10-bit parallel data at approximately 100 MHz.

\* \* \* \* \*